United States Patent
Brunner et al.

(10) Patent No.: US 6,263,211 B1
(45) Date of Patent: Jul. 17, 2001

(54) SYSTEM AND METHOD OF AUTOMATICALLY CONVEYING A WIRELESS OFFICE SYSTEM (WOS) FREQUENCY SET TO MOBILE STATIONS

(75) Inventors: Richard Brunner, Montreal; Akbar Rahman, Brossard, both of (CA)

(73) Assignee: Telefonaktiebolaget L M Ericsson (publ), Stockholm (DE)

( * ) Notice: Subject to any disclaimer, the term of this patent is extended or adjusted under 35 U.S.C. 154(b) by 0 days.

(21) Appl. No.: 09/159,930

(22) Filed: Sep. 24, 1998

(51) Int. Cl.7 ...................................... H04Q 7/20
(52) U.S. Cl. .................. 455/464; 455/426; 455/447; 455/448; 455/450; 455/462
(58) Field of Search ...................... 455/443, 444, 455/446, 447, 448, 449, 433, 450, 466, 422, 419, 462, 464, 465, 436, 437, 438, 439, 440, 426

(56) References Cited

U.S. PATENT DOCUMENTS

| | | | |
|---|---|---|---|
| 5,235,632 | * | 8/1993 | Raith ..................................... 455/449 |
| 5,422,930 | * | 6/1995 | McDonald et al. .................. 455/411 |
| 5,499,386 | | 3/1996 | Karlsson ............................. 455/33.2 |
| 5,504,803 | | 4/1996 | Yamada et al. ......................... 379/59 |
| 5,581,597 | * | 12/1996 | Dent et al. ............................ 455/450 |
| 5,640,677 | | 6/1997 | Karlsson ............................. 455/33.2 |
| 5,940,589 | * | 8/1999 | Donovan et al. ..................... 395/186 |
| 6,052,595 | * | 4/2000 | Schellinger et al. ................. 455/450 |
| 6,058,302 | * | 5/2000 | Westerberg .......................... 455/411 |

FOREIGN PATENT DOCUMENTS

| | | |
|---|---|---|
| WO 97/00588 | 1/1997 | (WO) . |
| WO 97/34402 | 9/1997 | (WO) . |
| WO 97/34437 | 9/1997 | (WO) . |

* cited by examiner

Primary Examiner—Nay Maung
Assistant Examiner—Ray Persino
(74) Attorney, Agent, or Firm—Smith, Danamraj & Youst, P.C.

(57) ABSTRACT

A system and method in a radio telecommunications network for automatically conveying a Wireless Office System (WOS) frequency set to a mobile station (MS) belonging to the WOS. The network includes a public cell, and a private WOS located within the public cell. A WOS controller sends the WOS frequency set from the WOS to an Equipment Identity Register (EIR) in the network whenever the WOS changes its frequency set. When the MS registers in the public cell in which the WOS is located, a mobile switching center (MSC) serving the public cell notifies an Intelligent Roaming Database (IRDB) of the registration. The IRDB fetches the WOS frequency set from the database, and obtains location information for the MS from a home location register (HLR). The IRDB then sends the WOS frequency set to the MS in an IS-136 R-DATA message.

9 Claims, 3 Drawing Sheets

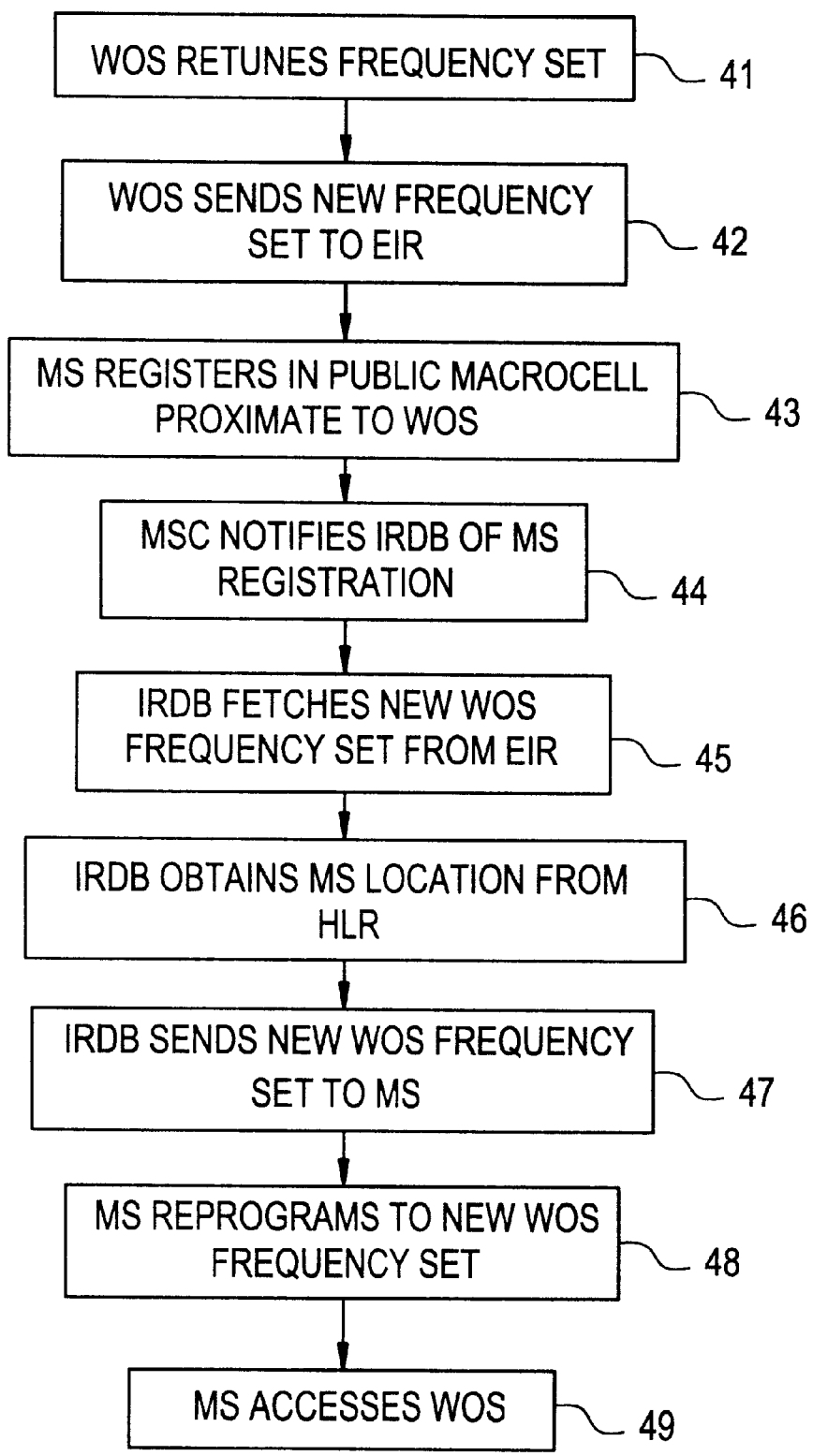

SYSTEM AND METHOD OF AUTOMATICALLY CONVEYING A WIRELESS OFFICE SYSTEM (WOS) FREQUENCY SET TO MOBILE STATIONS

BACKGROUND OF THE INVENTION

1. Technical Field of the Invention

This invention relates to radio telecommunication systems and, more particularly, to a system and method of automatically conveying a Wireless Office System (WOS) frequency set to mobile stations (MSs) belonging to the WOS whenever the WOS changes its frequency set.

2. Description of Related Art

Multi-level layered cellular radio architectures are known in the art and are utilized to increase capacity in the cellular network, especially in densely populated urban areas. In these hierarchical networks, microcells and picocells share capacity in areas also covered by larger macrocells. Server selection and handoff decisions can be quite complex in these networks, and U.S. Pat. Nos. 5,499,386 and 5,640,677 to Karlsson disclose a method of best server selection in which a decision as to the best serving cell for a mobile station is made based upon a preference value assigned to each cell and the signal strength with the mobile station. Microcells and picocells are preferred in this method since they add capacity to the network. For purposes of this disclosure, the term. "microcell" is construed as including picocells as well.

In an office building, the owner may install a private wireless office system (WOS) which may include a plurality of microcells providing cellular coverage for private subscribers within the office building. Nearby, there may be a base station for a macrocell which provides public coverage of an area which includes the office building. Signals from outside the office building (for example, from the nearby macrocell base station) penetrate the building, and it is possible for a MS within the building to access the Public Land Mobile Network (PLMN) through the macrocell. In fact, as shown in FIG. 1, the signal strength from the public macrocell 11 often exceeds the signal strength from the private WOS microcell 12. MSs typically scan for the channel with the strongest signal strength, and then access their network on that channel. It is desirable, however, for MSs that belong to the private system to access the WOS through the private microcell rather than accessing the P through the public macrocell. This may be accomplished by programming the MSs that belong to the private system with a Public Service Profile/Private Operating Frequency (PSP/POF). MSs first access the public system and determine if there is a PSP match. If so, the Ms utilize the corresponding POF to access the private WOS. The MSs may be programmed with the PSP/POF utilizing the Over-the-Air Activation System (OATS) which utilizes the IS-136 R-DATA message to program the MS over the air interface. Therefore, when the MSs attempt to access wireless service from within the building, they automatically select one of the microcells within the private system. The difference from the regular hierarchical cell structure described by Karlsson is that the private microcell is preferred only for the subscribers of that private system.

Portions of the frequency spectrum are allocated to various cellular operators. Each operator implements a frequency reuse plan which is designed to provide opium radio coverage within the operator's service area while minimizing co-channel interference. Once the operator has implemented the frequency plan, then any private WOSs within the service area can obtain frequencies for use in their private microcells. In a process much like a MS scanning for the best server, each WOS scans the entire cellular spectrum and picks a few operating frequencies that provide the least interference based on signal strength measurements taken across the spectrum. The best channel is picked for the digital control channel (DCCH). Then, as long as radio conditions are static, and the public operator does not retune (i.e., change the frequency plan for the public system), the frequencies for the WOS remain the same.

However, the radio conditions do not stay static for long. With growth in the number of subscribers, expansion of the network, and shifting traffic densities in the public system, cells are often moved, and new cells are added, and the public operator must retune the system. With. adaptive channel allocation (ACA) implemented, it is likely that frequencies will change even more often. This creates a problem for the WOSs within the operator'S service area. When the public system retunes, the WOSs automatically retune also, in order to pick operating frequencies that provide the least interference. When a WOS retunes, however, the MSs belonging to the WOS are no longer programmed with the proper WOS frequencies. In atypical scenario, a subscriber may leave his office on Friday and take his MS home with him. Over the weekend, the public system retunes, prompting the subscribers WOS to retune as well. When the subscriber returns to his office on Monday and originates a call, his MS cannot locate a WOS frequency, and accesses the public system instead.

Typically, the owner of the private WOS may pay a monthly flat fee to the public operator for system access, or may pay a preferential rate for calls within the WOS. If a subscriber belonging to the WOS inadvertently accesses the public system rather than the WOS, then the private subscriber's call is charged for the call at the public rate rather than the private system rate. If so, the subscriber may think his calls are free, or at the preferential rate, when they are not.

There are no known prior art teachings of a solution to the aforementioned deficiency and shortcoming such as that disclosed herein. One solution is to manually reprogram all the MSs in the WOS whenever the WOS retunes. However, this is an extremely inefficient and difficult process when there are large numbers of MSs in the private system. In order to overcome the disadvantage of existing solutions, it would be advantageous to have a system and method of automatically conveying a WOS frequency set to MSs belonging to the WOS whenever the WOS changes its frequency set. The present invention provides such a system and method.

SUMMARY OF THE INVENTION

In one aspect, the present invention is a system in a radio telecommunications network for automatically conveying a Wireless Office System (WOS) frequency set to a mobile station (MS) belonging to the WOS. The network includes a public cell, and a private WOS located within the public cell. The system comprises a WOS controller that sends the WOS frequency set from the WOS to a database in the network whenever the WOS changes its frequency set, a mobile switching center (MSC) serving the public cell that determines that the MS registered in the public cell in which the WOS is located, means for fetching the WOS frequency set from the database, and means for sending the WOS frequency set to the MS. The database may be an Equipment Identity Register (EIR), and the means for fetching the WOS frequency set may be an Intelligent Roaming Database (IRDB) which is triggered to. fetch the WOS frequency set by the MS registration. The IRDB may send the WOS frequency set to the MS in an IS-136 R-DATA message.

In another aspect, the present invention is a method in a radio telecommunications network of automatically conveying a Wireless Office System (WOS) frequency set to a mobile station (MS) belonging to the WOS. The network includes a public cell, and a private WOS located within the public cell. The method includes the steps of sending the WOS frequency set from the WOS to a database in the network, determining that the MS registered in the public cell in which the WOS is located, fetching the WOS frequency set from the database, and sending the WOS frequency set to the MS. The database may be an Equipment Identity Register (EIR), and the WOS frequency set may be fetched by an Intelligent Roaming Database (IRDB) which sends the WOS frequency set to the MS in an IS-136 R-DATA message.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 3 is a flow chart illustrating the steps of the preferred embodiment of the method of the present invention.

DETAILED DESCRIPTION OF EMBODIMENTS

Figure 1:
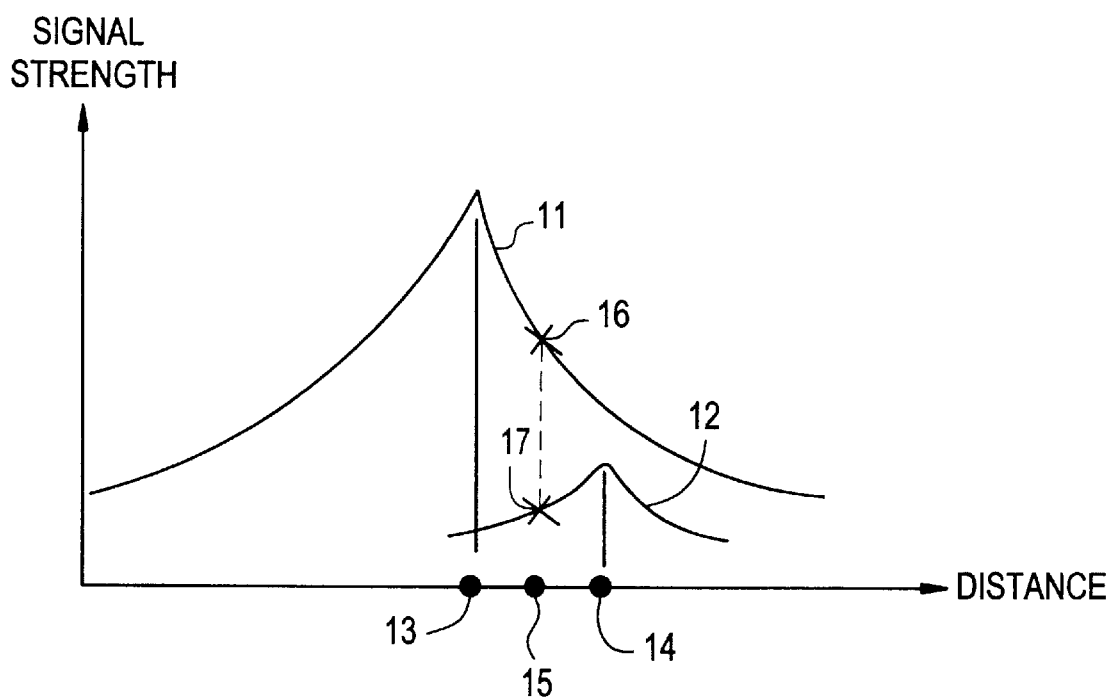
FIG. 1 is a graphical illustration of the relative signal strength levels in a cellular telecommunications network having a public macrocell and a private wireless office system (WOS) microcell within the service area of the macrocell.

FIG. 1 is a graphical illustration of the relative signal strength levels in a cellular telecommunications network having a public macrocell 11 and a private wireless office system (WOS) microcell 12 within the service area of the macrocell. The macrocell is centered on a public base station (BS) 13 which transmits and receives the radio signals defining the macrocell. The WOS microcell is centered on a WOS BS 14 which transmits and receives the radio signals defining the microcell. A mobile station (MS) 15 is operating within the service areas of both the macrocell 11 and the microcell 12. It is readily apparent that the signal strength from the macrocell exceeds the signal strength of the microcell at the location of the MS by an amount equal to the difference between the signal strength at point 16 and the signal strength at point 17. Therefore, when accessing the cellular network, the MS normally accesses the macrocell 11 unless the MS is programmed with the frequency set of the WOS, and is instructed to give preference to those frequencies.

Figure 2:
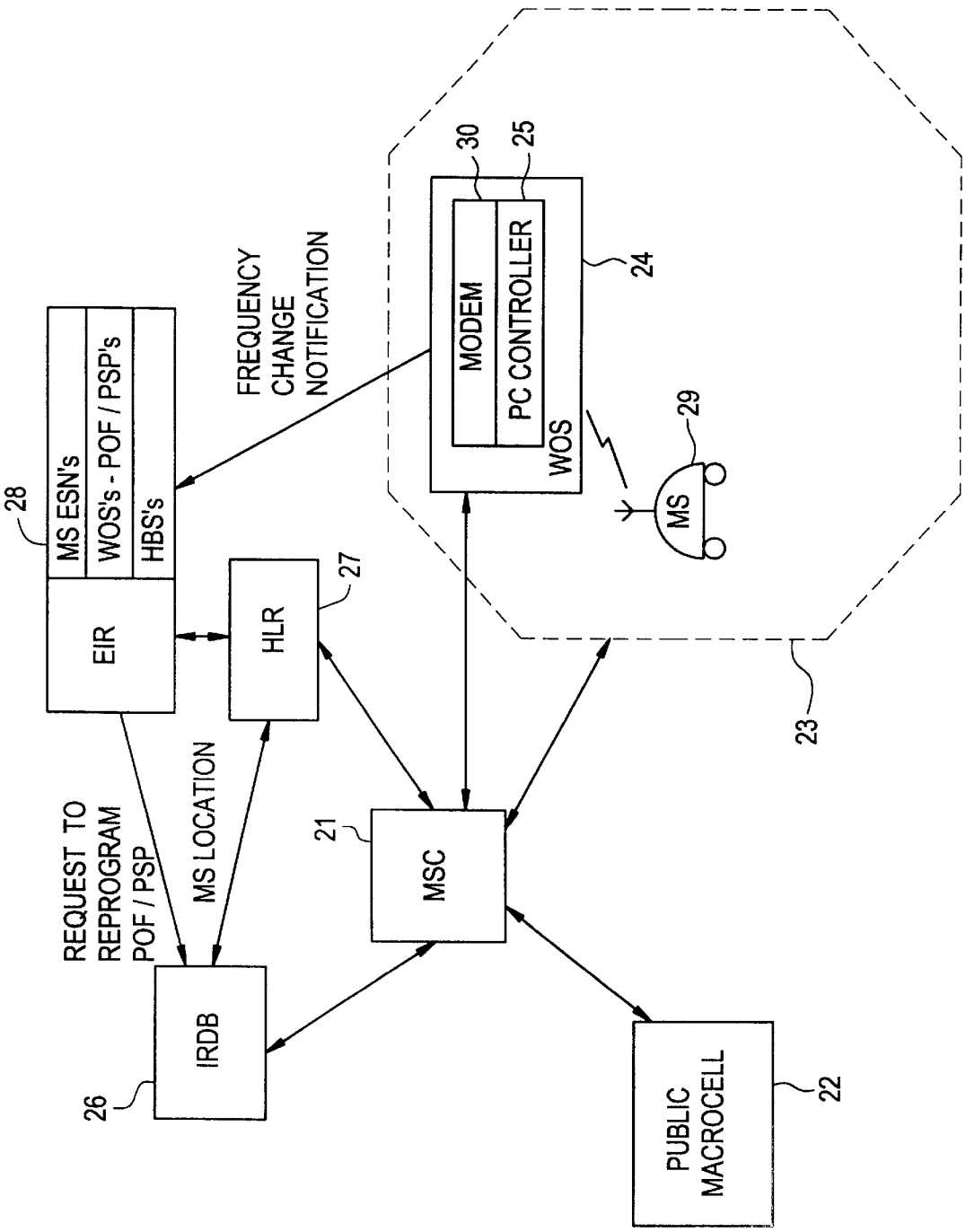
FIG. 2 is a simplified block diagram of the preferred embodiment of the system of the present invention.

FIG. 2 is a simplified block diagram of the preferred embodiment of the system of the present invention A Mobile Switching Center (MSC) 21 is connected to a public macrocell 22, a public macrocell 23, and a WOS 24 within the public macrocell 23. The WOS includes a PC controller 25 and a modem 30. The MSC is also connected to a Intelligent Roaming Database (IRDB) 26 and a Home Location Register (HLR) 27. The IRDB is a database which coordinates all Public Service Profiles/Private Operating Frequencies (PSP/POFs) for a given MS subscription. The IRDB and the HLR are connected, in turn, to an Equipment Identity Register EIR) 28. A MS 29 is shown operating in the service area of the WOS 24 which is within the service area of the public macrocell 23.

In the present invention, the functions of the EIR 28 are expanded considerably over the prior art. In existing systems, the EIR is typically part of the HLR, and merely stores information on MSs and their Electronic Serial Numbers (ESNs). The EIR is shown separately from the HLR in FIG. 2 due to its expanded functionality. In the present invention, the EIR contains a database of all WOSs in the network. The database includes the current frequency set in use by each WOS. The EIR also stores all the Home Base Stations (HBSs) in the network along with an indication of their validity.

When the WOS 24 retunes, it sends a frequency change notification. to the EIR 28 with the new WOS frequency set. The WOS is controlled by the PC controller 25. The PC controller is connected to the Internet through the modem 30. The PC controller reports the change in the WOS's frequency set over the Internet to the EIR. When the MS 29 registers in the public macrocell that is proximate to the WOS (i.e., macrocell 23), the MSC 21 reports the registration to the IRDB 26. The IRDB then fetches the new WOS frequency set from the EIR. The fetching operation is triggered by the MS's registration. The EIR sends the new WOS frequency set to the IRDB along with a request to reprogram the MS.

The IRDB 26 has links to the HLR 27 and the MSC 21, so the IRDB can obtain location information on the MS 29. The IRDB then downloads the appropriate PSP/POF to the MS. This enables the MS to quickly lock onto the frequencies of the WOS. To download the PSP/POF data, the IRDB preferably utilizes the Over-the-Air Activation System (OATS). OATS utilizes the IS-136 R-DATA message to program the MS with the new WOS frequency set over the air interface.

FIG. 3 is a flow chart illustrating the steps of the preferred embodiment of the method of the present invention. At step 41, the WOS 24 retunes its frequency set, for example, in response to a returning by the public system. At 42, the WOS sends its new frequency set (PSP/POF) to the EIR 28. This data transfer may be accomplished, for example, via an Internet connection from the WOS's PC controller 25. At step 43, the MS 29 returns to the service area of the WOS and registers in the public macrocell 23 proximate to the WOS since the MS has not been informed of the new WOS frequencies. The MSC 21 notifies the IRDB 26 of the region at 44, and may optionally pass location information, if known, to the IRDB. At step 45, the IERDB fetches the new WOS frequency set from the EIR, and obtains MS location information from the HLR 27 at step 46. The IRDB then sends the new WOS frequency set to the MS at 47. This data transfer is preferably performed utilizing the OATS system by sending an IS136 R-DATA message to the MS. The MS reprograms to the new WOS frequency set at 48. Thereafter, the MS accesses the WOS at 49 when cellular services are requested.

It is thus believed that the operation and construction of the present invention will be apparent from the foregoing description. While the system and method shown and described have been characterized as being preferred, it will be readily apparent that various changes and modifications could be made therein without departing from the scope of the invention as defined in the following claims.

What is claimed is:

1. In a radio telecommunications network having a public cell, and a private Wireless Office System (WOS) located within the public cell, a method of automatically conveying a WOS frequency set to a mobile station (MS) belonging to the WOS, said method comprising the steps of:

determining the WOS frequency set in the WOS;

sending the WOS frequency set from the WOS to an enhanced Equipment Identity Register (EIR) in the network;

determining in a mobile switching center (MSC) serving the public cell whether the MS registered in the public cell in which the WOS is located;

notifying by the MSC, an Intelligent Roaming Database (IRDB) that the MS has registered in the public cell;

fetching by the IRDB, the WOS frequency set from the EIR, upon determining that the MS registered in the public cell in which the WOS is located; and sending the WOS frequency set to the MS.

2. The method of automatically conveying a WOS frequency set to a MS of claim 1 wherein the step of sending the WOS frequency set from the WOS to an EIR in the network includes sending the WOS frequency set to the EIR whenever the WOS changes its frequency set.

3. The method of automatically conveying a WOS frequency set to a MS of claim 1 wherein the step of sending the WOS frequency set from the WOS to an EIR in the network includes sending the WOS frequency set over an Internet connection to the EIR.

4. The method of automatically conveying a WOS frequency set to a MS of claim 1 wherein the step of sending the WOS frequency set to the MS includes sending the WOS frequency set to the MS in an IS-136 R-DATA message.

5. The method of automatically conveying a WOS frequency set to a MS of claim 4 wherein the step of sending the WOS frequency set to the MS also includes obtaining location information for the MS from a home location register (HLR) in the network.

6. In a radio telecommunications network having a public cell, a mobile switching center (MSC) serving the public cell, and a private Wireless Office System (WOS) located within the public cell, a method of automatically conveying a WOS frequency set to a mobile station (MS) belonging to the WOS, said method comprising the steps of:

sending the WOS frequency set over an Internet connection from the WOS to an Equipment Identity Register (EIR) in the network whenever the WOS changes its frequency set;

determining that the MS registered in the public cell in which the WOS is located;

notifying by the MSC, an Intelligent Roaming Database (IRDB) that the MS has registered in the public cell;

fetching by the IRDB, the WOS frequency set from the EIR; and obtaining location information for the MS from a home location register (LHR) in the network; and sending the WOS frequency set to the MS in an IS-136 R-DATA message.

7. In a radio telecommunications network having a public cell, and a private Wireless Office System (WOS) located within the public cell, a system for automatically conveying a WOS frequency set to a mobile station (MS) belonging to the WOS, said system comprising:

means within the WOS for changing the WOS frequency set in response to changing radio conditions;

an enhanced Equipment Identity Register (EIR) in the network that stores the WOS frequency set;

a WOS controller that sends the WOS frequency set from the WOS to the EIR whenever the WOS changes its frequency set;

a mobile switching center (MSC) serving the public cell that determines that the MS registered in the public cell in which the WOS is located;

an Intelligent Roaming Database (IRDB) that fetches the WOS frequency set from the EIR when the IRDB is notified by the MSC that the MS registered in the public cell in which the WOS is located; and means for sending the WOS frequency set to the MS.

8. The system for automatically conveying a WOS frequency set to a MS of claim 7 further comprising an Internet connection between the WOS controller and the EIR.

9. The system for automatically conveying a WOS frequency set to a MS of claim 7 wherein the means for sending the WOS frequency set to the MS includes means for sending an IS-136 R-DATA message from the IRDB to the MS, the R-DATA message including the WOS frequency set.

* * * * *

UNITED STATES PATENT AND TRADEMARK OFFICE
CERTIFICATE OF CORRECTION

PATENT NO. : 6,263,211 B1
DATED : July 17, 2001
INVENTOR(S) : Brunner et al.

Page 1 of 1

It is certified that error appears in the above-identified patent and that said Letters Patent is hereby corrected as shown below:

Column 1,
Line 46, delete "P" and substitute -- PLMN -- therefor.
Line 51, delete "Ms" and substitute -- MSs -- therefor.

Column 2,
Line 15, delete "With." and substitute -- With -- therefor.
Line 18, delete "operator'S" and substitute -- operator's -- therefor.
Line 23, delete "atypical" and substitute -- a typical -- therefor.

Column 3,
Line 2, delete "to." and substitute -- to -- therefor.

Column 4,
Line 2, delete "EIR)" and substitute -- (EIR) -- therefor.

Signed and Sealed this

Twenty-ninth Day of January, 2002

Attest:

*Attesting Officer*

JAMES E. ROGAN
*Director of the United States Patent and Trademark Office*